J. R. CRABTREE.
HEAD GATE.
APPLICATION FILED AUG. 30, 1906.
908,961.
Patented Jan. 5, 1909.
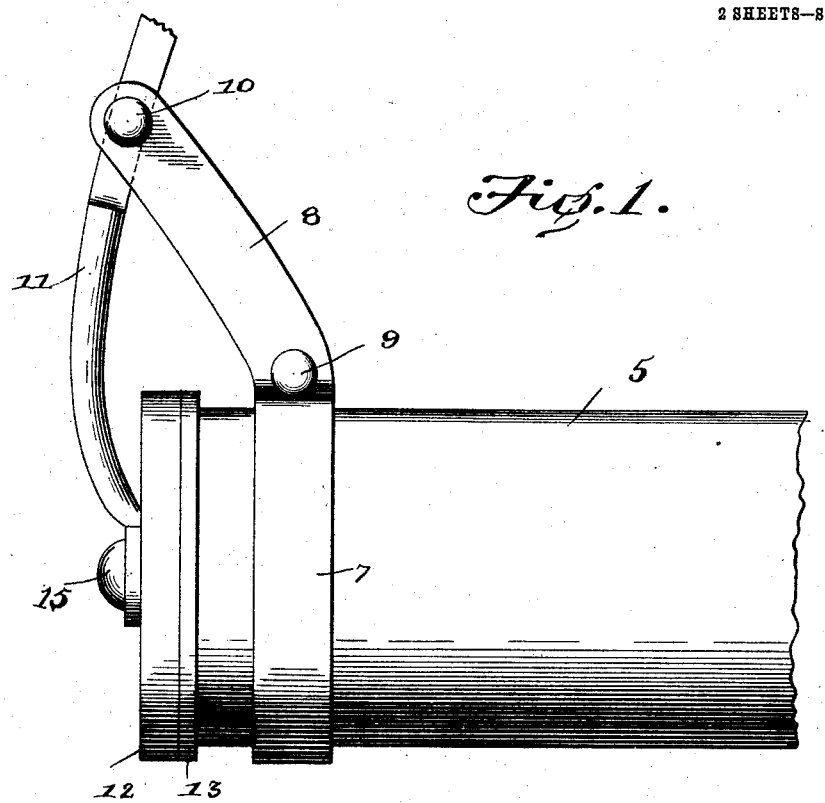
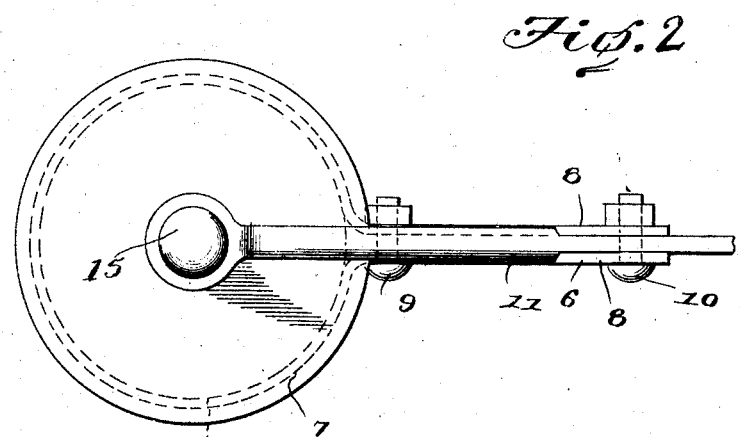

J. R. CRABTREE.
HEAD GATE.
APPLICATION FILED AUG. 30, 1906.
908,961.
Patented Jan. 5, 1909.
2 SHEETS—SHEET 2.
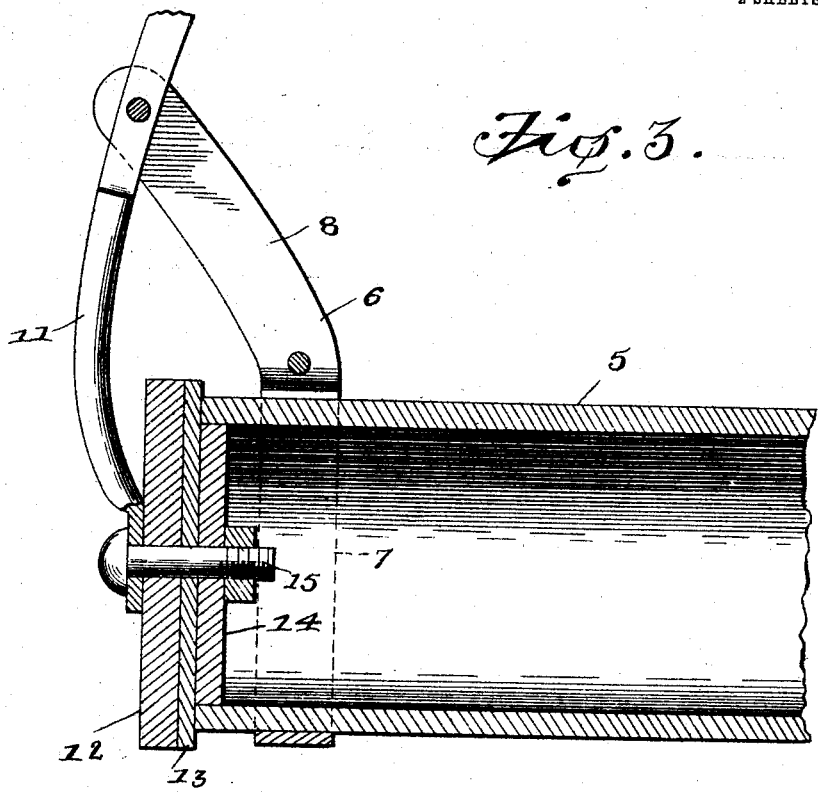
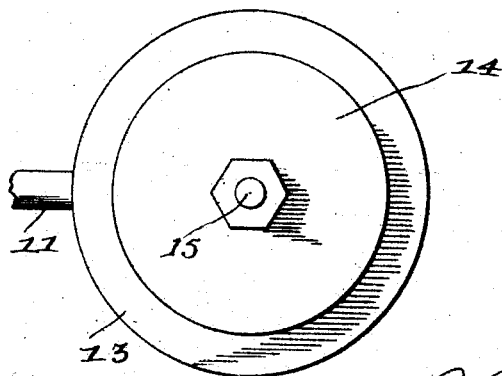
WITNESSES:
W. S. Rockwell
James W. Timm
INVENTOR
J. R. Crabtree
BY
Crandall & Crandall
Attorneys

UNITED STATES PATENT OFFICE.

JAMES ROBERT CRABTREE, OF KEOTA, OKLAHOMA.

HEAD-GATE.

No. 908,961.  Specification of Letters Patent.  Patented Jan. 5, 1909.

Application filed August 30, 1906. Serial No. 332,689.

*To all whom it may concern:*

Be it known that I, JAMES ROBERT CRABTREE, a citizen of the United States, residing at Keota, in the county of Beaver, State of Oklahoma, have invented certain new and useful Improvements in Head-Gates; and I do hereby declare the following to be a full, clear, and exact description of the invention, such as will enable others skilled in the art to which it appertains to make and use the same.

This invention relates to head gates and has for one of its objects to provide a novel form of head gate valve for a stand pipe and to simplify the construction of devices of this nature, at the same time adding to their efficiency.

Another object of the invention is to produce a simply constructed device whereby the valve may be quickly and readily adjusted to its seat, so that in event of wear or other variations the valve may be maintained in operative position.

The valve contemplated by my invention is of such construction that it may be readily and quickly attached to and detached from a stand pipe and when closed will effectually stop the flow of water.

In the accompanying drawings, Figure 1 is a side elevation of the invention. Fig. 2 is a top plan view thereof. Fig. 3 is a vertical sectional view therethrough, Fig. 4 is a plan view of the working face of the valve plate.

Referring more specifically to the drawings, the numeral 5 denotes the stand pipe which is of the usual construction, and 6 denotes a bracket for supporting the valve which closes the stand pipe at times. The bracket 6 comprises a portion 7, which encircles the stand pipe, and spaced arms 8 which are formed at each end of the portion 7 and extend laterally from the pipe and slightly upwardly with their upper ends located in a plane above the upper end of the said pipe. A bolt 9 is engaged through the arms 8 at their point of junction with the member 7 and serves to clamp the member upon the pipe at the desired point. A bolt 10 is engaged through the upper ends of the arms 8 and also through a lever 11, to one end of which is secured the valve plate embodied in my invention. The bolt 10 is located intermediate the ends of the lever 11 and it will be understood that by reason of this fact the end of the lever opposite the valve plate may be grasped to rock the said lever and seat or unseat the said valve plate. The valve plate mentioned above comprises disks 12, 13 and 14 through which and said end of the lever 11 is engaged a bolt 15 which serves to secure the said plate to the lever. The disk 12 is the outermost one of the three disks above mentioned and is of slightly larger diameter than the upper end of the stand pipe 5, and the disk 13 which is located between the disks 12 and 14 is of leather or other suitable material and is of substantially the same diameter as the disk 12. The disk 14, like the disk 12, is preferably of sheet metal and is of such diameter that it will exactly fit in the open end of the said stand pipe 5.

From the above, it will be seen that by arranging the disks in this manner, a working surface of the disk 13 is exposed for contact with the end of the pipe 5 and the said working surface is braced by the plate 12, thus forming an extremely simple, but very efficient, form of valve. Furthermore, it is obvious that the bracket which supports the valve and its lever may be quickly detached from the pipe when so desired by simply removing the bolt 9 therefrom. From the above it will also be seen that the clamp member 7 may be readily adjusted longitudinally of the pipe 5 by simply loosening the clamp bolt 9, so that the operative position of the valve and its seat may be maintained. By this means any wear or other irregularity of surface of the valve seat may be quickly adjusted, and the valve maintained at all times in operative position relative to its seat. This is an important feature of the invention, and adds materially to its value, efficiency and utility.

What is claimed as the invention, is:—

1. The combination with a stand pipe having its open end extending at right angles to the pipe and forming a flat valve seat, a valve engaging said seat, an arm rigidly united to said valve and extending laterally therefrom, a clamping device, means for adjusting said clamping device longitudinally of said stand pipe, an angular member extending from said clamping device, and a pivoted means for movably connecting said valve arm and said angular member, whereby the adjustment of the valve may be maintained relative to its seat.

2. The combination with a stand pipe having its open end extended at right angles to the pipe and forming a flat valve seat, a valve engaging said seat, an arm rigidly united to said valve and extending laterally therefrom, a band encompassing said pipe and spaced from said valve seat and having spaced projecting portions extending at an angle therefrom and bearing at opposite sides of said valve arm, a pivot extending through said spaced projections and through said valve arm, and a clamping bolt extending through said projections adjacent to said pipe.

In testimony whereof, I affix my signature, in presence of two witnesses.

JAMES ROBERT CRABTREE.

Witnesses:
BARTON DUNCAN,
GEORG. W. DAVID.